US 11,828,353 B1

(12) United States Patent
Gianone et al.

(10) Patent No.: US 11,828,353 B1
(45) Date of Patent: Nov. 28, 2023

(54) AXLE ASSEMBLY HAVING A PLANETARY GEAR SET

(71) Applicant: ArvinMeritor Technology, LLC, Troy, MI (US)

(72) Inventors: Roberto Gianone, Cameri (IT); Marco Fratelli, Cameri (IT)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/944,365

(22) Filed: Sep. 14, 2022

(51) Int. Cl.
| | |
|---|---|
| *F16H 37/08* | (2006.01) |
| *F16H 57/08* | (2006.01) |
| *F16H 63/04* | (2006.01) |
| *B60K 1/00* | (2006.01) |

(52) U.S. Cl.
CPC .......... *F16H 37/082* (2013.01); *B60K 1/00* (2013.01); *F16H 57/082* (2013.01); *F16H 63/04* (2013.01); *B60K 2001/001* (2013.01)

(58) Field of Classification Search
CPC ......... F16H 48/05; F16H 37/082; B60K 1/00; B60K 2001/001
See application file for complete search history.

(56) References Cited

U.S. PATENT DOCUMENTS

| 5,643,126 A * | 7/1997 | Hotta ................ F16H 57/0482 |
| | | 184/6.12 |
| 7,261,667 B2 * | 8/2007 | Berger ................ F16H 1/2863 |
| | | 475/347 |
| 8,523,738 B2 * | 9/2013 | Morscheck ............ B60K 17/16 |
| | | 475/221 |
| 10,889,205 B2 | 1/2021 | Hettrich et al. |
| 10,989,288 B1 | 4/2021 | Ghatti et al. |
| 11,001,134 B2 * | 5/2021 | Haka ...................... F16H 48/24 |
| 11,001,140 B1 * | 5/2021 | Varela .................... F16C 19/06 |
| 11,002,352 B2 | 5/2021 | Ghatti et al. |
| 11,038,396 B2 | 6/2021 | Raya et al. |
| 11,207,976 B2 | 12/2021 | Ghatti et al. |
| 11,209,072 B2 | 12/2021 | Ghatti et al. |
| 11,220,176 B1 | 1/2022 | Cradit et al. |
| 11,273,700 B2 | 3/2022 | Garcia et al. |
| 2021/0102607 A1 * | 4/2021 | Ghatti .................... F16H 3/089 |
| 2021/0291646 A1 | 9/2021 | Lorenz et al. |

OTHER PUBLICATIONS

Cradit et al., U.S. Appl. No. 17/308,307, filed May 5, 2021, 46 pages.

* cited by examiner

*Primary Examiner* — Derek D Knight
(74) *Attorney, Agent, or Firm* — Brooks Kushman PC (57) ABSTRACT

An axle assembly that has an electric motor, a countershaft, a planetary gear set, a drive pinion, and a differential assembly. The electric motor has a rotor that is rotatable about a rotor axis. The planetary gear set operatively connects the rotor to the countershaft. The drive pinion operatively connects the differential assembly to the countershaft.

20 Claims, 7 Drawing Sheets

AXLE ASSEMBLY HAVING A PLANETARY GEAR SET

TECHNICAL FIELD

This relates to an axle assembly having an electric motor module and a planetary gear set.

BACKGROUND

An axle assembly having an electric motor module and a planetary gear set is disclosed in U.S. Pat. No. 11,273,700.

SUMMARY

In at least one embodiment an axle assembly is provided. The axle assembly includes an electric motor, a countershaft, a planetary gear set, a differential assembly, and a drive pinion. The electric motor has a rotor. The rotor is rotatable about a rotor axis. The countershaft is rotatable about a countershaft axis. The planetary gear set operatively connects the rotor to the countershaft. The drive pinion is rotatable about a drive pinion axis. The drive pinion operatively connects the differential assembly to the countershaft.

The rotor axis may differ from the countershaft axis. The countershaft axis may differ from the drive pinion axis. The drive pinion axis may differ from the rotor axis.

The planetary gear set may include a sun gear, a planetary ring gear, a planet gear, and a planet gear carrier. The sun gear may be rotatable about the rotor axis. The planet gear may mesh with the sun gear and the planetary ring gear. The planet gear carrier may be rotatable about the rotor axis. The planet gear carrier may rotatably support the planet gear. The planet gear carrier may be rotatably supported on a support module. The support module may extend from the planetary ring gear. The countershaft may be rotatably supported on the planetary ring gear.

The support module may include a set of arms and a center support. The set of arms may extend from the planetary ring gear to the center support. Members of the set of arms may be spaced apart from each other. Members of the set of arms may extend from the planetary ring gear toward the rotor axis.

The planet gear carrier may be axially positioned between the center support and the rotor. The countershaft axis may be disposed below the center support. The center support may include a support shaft. The support shaft may extend along the rotor axis. The support shaft may extend toward the rotor. The planet gear carrier may encircle the support shaft.

A bearing assembly may encircle the support shaft. The bearing assembly may rotatably support the planet gear carrier on the support shaft.

The axle assembly may include a shift mechanism. The shift mechanism may be rotatable about the rotor axis. The shift mechanism may be moveable along the rotor axis. The shift mechanism may be moveable between a first position and a second position. The shift mechanism may connect the rotor to the sun gear in the first position. The shift mechanism may connect the rotor to the planet gear carrier in the second position. The shift mechanism may include a cavity that receives the support shaft.

A shift mechanism actuator may actuate the shift mechanism. The shift mechanism actuator may be mounted to a cover. The cover may be disposed at an end of the electric motor that faces away from the planetary gear set.

The planet gear carrier may include an external gear. The external gear may mesh with a connecting gear. The connecting gear may be rotatable about the countershaft axis with the countershaft. The external gear may face away from the rotor axis. The external gear may be axially positioned along the rotor axis closer to the center support than an internal gear of the planet gear carrier is positioned to the center support. The internal gear may face toward the rotor axis. The external gear may encircle a bearing assembly. The bearing assembly may rotatably support the planet gear carrier on the support shaft. The support shaft may be fixedly coupled to the planetary ring gear.

The planetary ring gear may include a countershaft support. The countershaft support may extend away from the electric motor. The countershaft support may support the connecting gear.

A bearing assembly may encircle the countershaft support. The bearing assembly may rotatably support the connecting gear on the countershaft support. The connecting gear may define a cavity. The cavity may receive the bearing assembly. The cavity may receive the countershaft. The connecting gear may encircle the bearing assembly.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
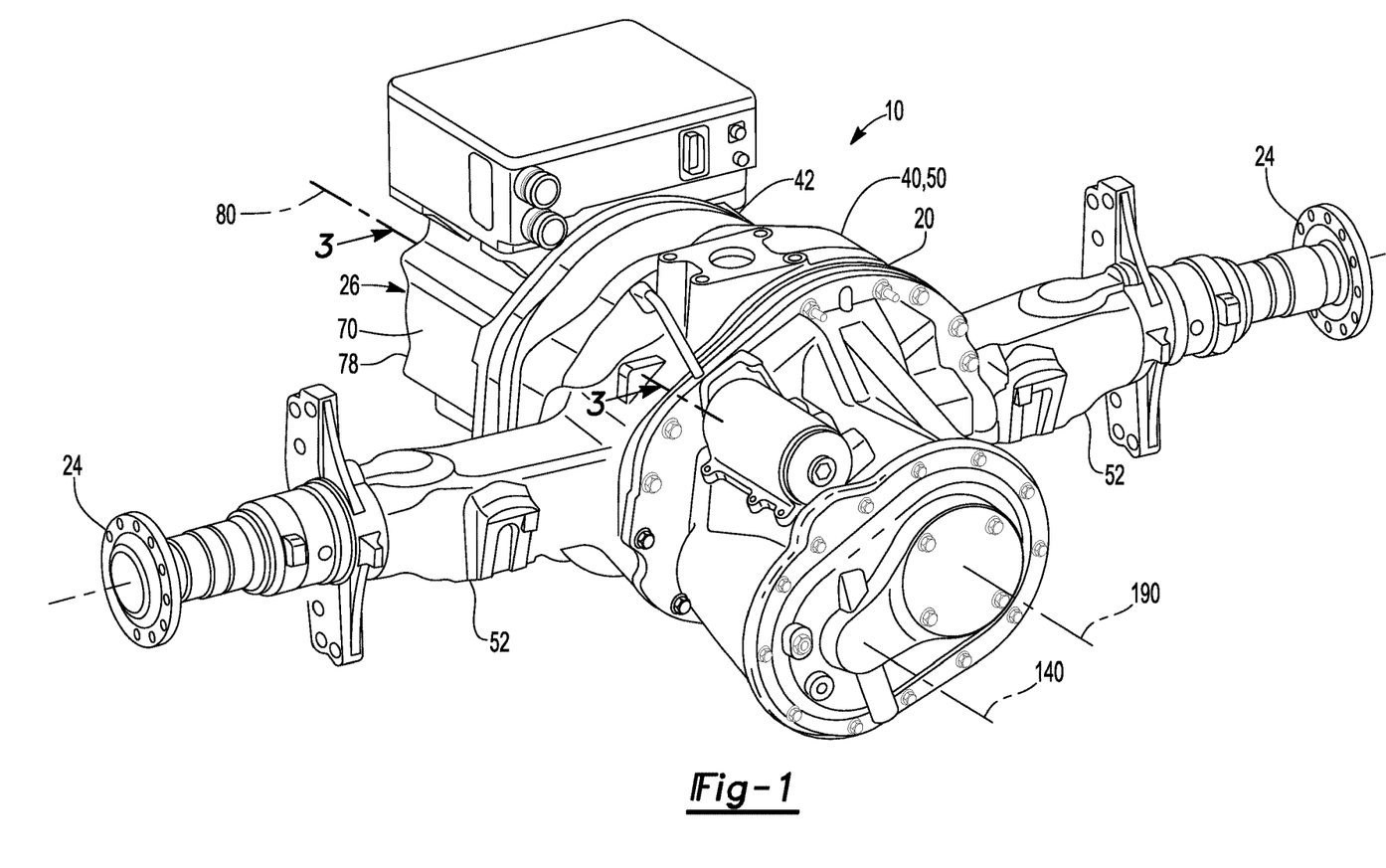
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

Figure 2:
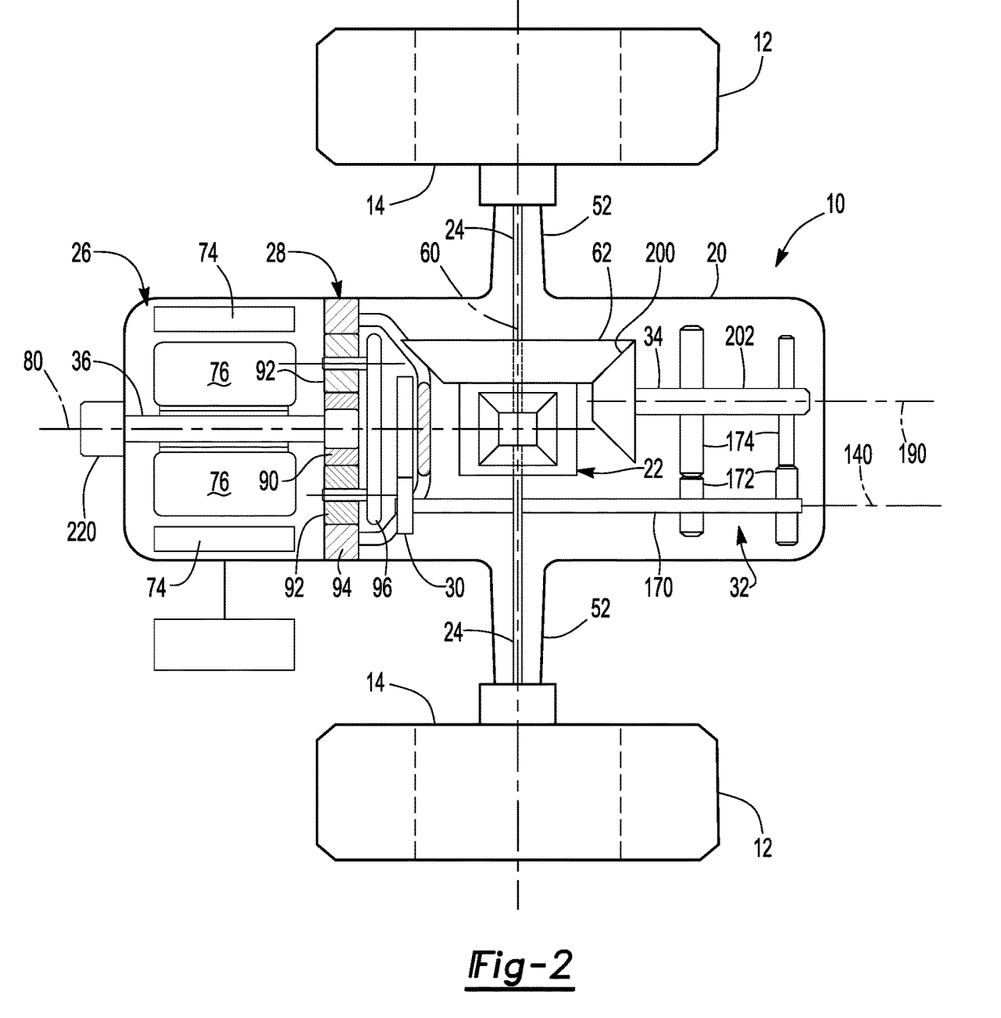
FIG. 2 is a simplified top view of the axle assembly.

As is best shown in FIG. 2, the axle assembly 10 is configured to provide torque to one or more traction wheel assemblies that may include a tire 12 mounted on a wheel 14. One or more axle assemblies may be provided with the vehicle. In at least one configuration, the axle assembly 10 includes a housing assembly 20, a differential assembly 22, at least one axle shaft 24, an electric motor module 26, a planetary gear set 28, a connecting gear 30, a countershaft transmission 32, a drive pinion 34, and a shift mechanism 36.

Referring primarily to FIG. 1, the housing assembly 20 receives various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

The center portion 50 may be disposed proximate the center of the axle housing 40. The center portion 50 may define a cavity that may at least partially receive the differential assembly 22.

One or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

The differential carrier 42 may be mounted to the center portion 50 of the axle housing 40. The differential carrier 42 may support the differential assembly 22. For example, the differential carrier 42 may include one or more bearing supports that may support a bearing that may rotatably support the differential assembly 22. The differential carrier 42 may also facilitate mounting of the electric motor module 26.

Figure 3:
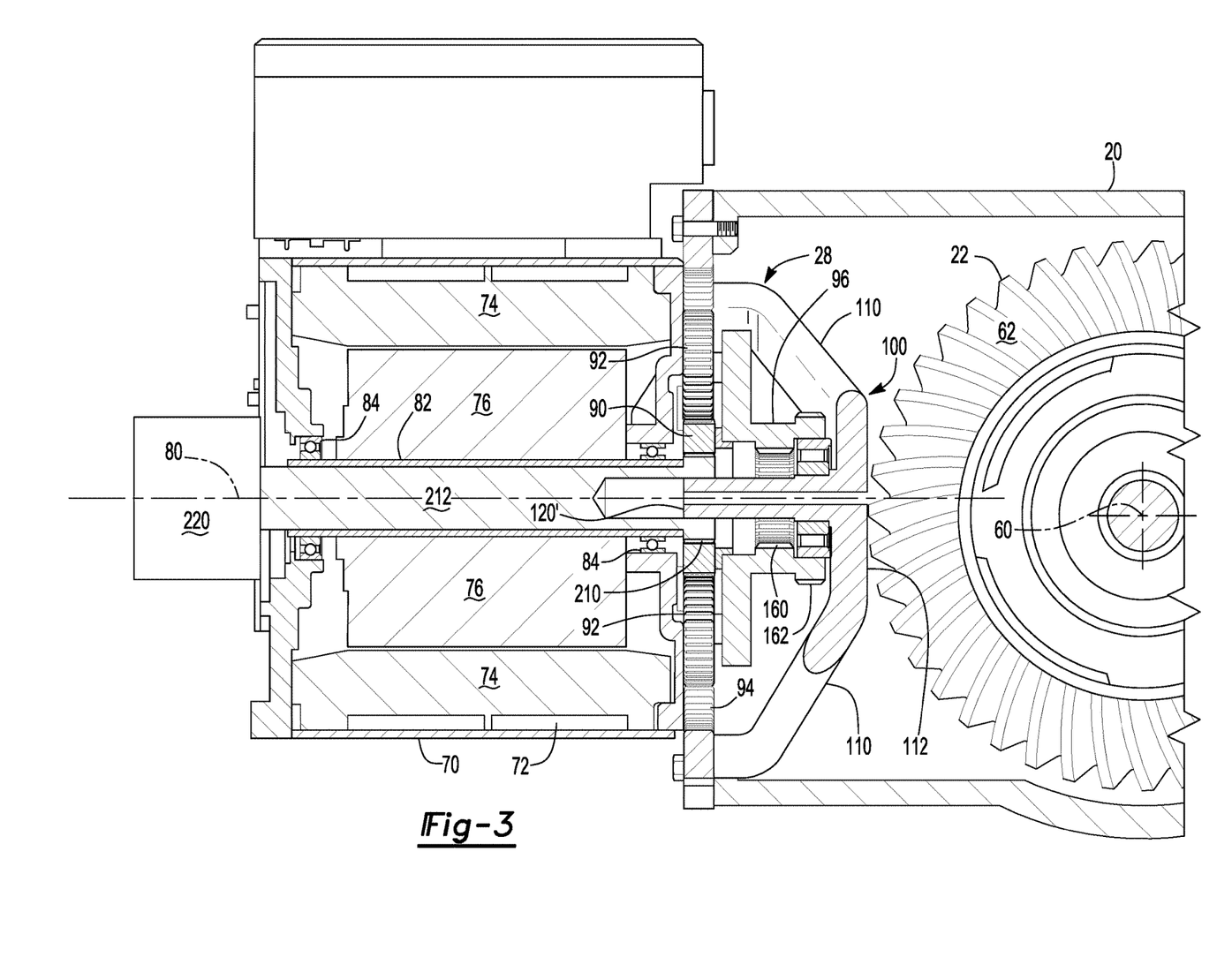
FIG. 3 is a section view of a portion of the axle assembly along section line 3-3 that includes a planetary gear set.

Referring to FIGS. 2 and 3, the differential assembly 22 may be at least partially received in the center portion 50 of the axle housing 40. The differential assembly 22 may be rotatable about a differential axis 60 and may transmit torque to the axle shafts 24 and wheels 14. The differential assembly 22 may be operatively connected to the axle shafts 24 and may permit the axle shafts 24 to rotate at different rotational speeds in a manner known by those skilled in the art. The differential assembly 22 may have a ring gear 62 that may have teeth that mate or mesh with the teeth of a gear portion of the drive pinion 34. Accordingly, the differential assembly 22 may receive torque from the drive pinion 34 via the ring gear 62 and transmit torque to the axle shafts 24 to propel the vehicle. Torque transmission may be bidirectional.

Referring primarily to FIGS. 1 and 2, the axle shafts 24 transmit torque between the differential assembly 22 and corresponding wheels 14. Two axle shafts 24 may be provided such that each axle shaft 24 extends through a different arm portion 52 of axle housing 40. The axle shafts 24 may extend along and may be rotatable about an axis, which may be the differential axis 60 or another axis, such as in a configuration having an independent suspension. Each axle shaft 24 may have a first end and a second end. The first end may be operatively connected to the differential assembly 22. The second end may be disposed opposite the first end and may be operatively connected to a wheel 14.

Referring primarily to FIGS. 2 and 3, the electric motor module 26, which may also be referred to as an electric motor, may be mounted to the axle housing 40 and/or the differential carrier 42 and may be operatively connectable to the differential assembly 22. For instance, the electric motor module 26 may provide torque to the differential assembly 22 via the planetary gear set 28, the connecting gear 30, the countershaft transmission 32, and the drive pinion 34 as will be discussed in more detail below. In at least one configuration, the electric motor module 26 may include a motor housing 70, a coolant jacket 72, a stator 74, a rotor 76, and a cover 78.

Referring primarily to FIG. 3, the motor housing 70 is an outer housing of the electric motor module 26. The motor housing 70 may extend between the differential carrier 42 and the cover 78. For instance, the motor housing 70 may be mounted to the differential carrier 42 and the cover 78 and may extend from the differential carrier 42 to the cover 78. The motor housing 70 may encircle the coolant jacket 72.

The coolant jacket 72 facilitates the circulation of a fluid to help cool or remove heat from the stator 74. The coolant jacket 72 may encircle the stator 74.

The stator 74 is fixedly positioned with respect to the coolant jacket 72. For example, the stator 74 may encircle the rotor 76 and may include stator windings that may be received inside and may be fixedly positioned with respect to the coolant jacket 72.

The rotor 76 extends around and is rotatable about the rotor axis 80 with respect to the stator 74. The rotor 76 is spaced apart from the stator 74 but may be disposed in close proximity to the stator 74. The rotor 76 may include a rotor shaft 82 that may be rotatably supported on one or more rotor bearing assemblies 84.

The cover 78 is mountable to the motor housing 70. For instance, the cover 78 may be disposed at an end of the electric motor or end of the motor housing 70 that faces away from the planetary gear set 28. As such, the cover 78 may be disposed opposite the axle housing 40 and the differential carrier 42.

Referring to FIGS. 2-7, the planetary gear set 28 operatively connects the rotor 76 and the countershaft transmission 32. For instance, the planetary gear set 28 may operatively connect the rotor 76 to a countershaft 170 of the countershaft transmission 32 via the connecting gear 30. In at least one configuration, the planetary gear set 28 includes a sun gear 90, one or more planet gears 92, a planetary ring gear 94, and a planet gear carrier 96.

Figure 6:
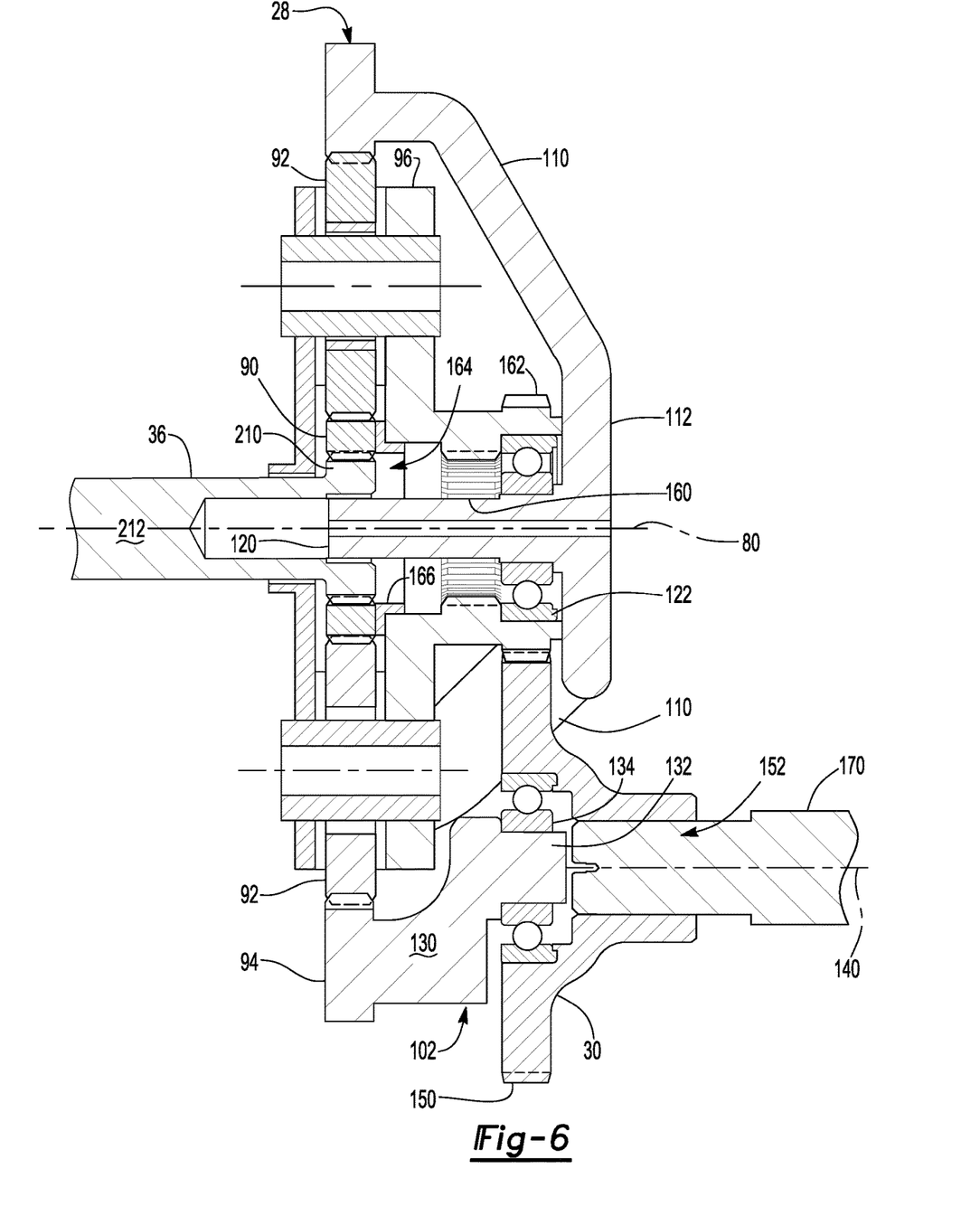
FIG. 6 is a section view along section line 5-5 showing a shift mechanism in a first position.

Referring primarily to FIGS. 3 and 6, the sun gear 90 is rotatable about the rotor axis 80. For instance, the sun gear 90 is rotatable about the rotor axis 80 with the rotor 76 when the shift mechanism 36 couples the rotor 76 to the sun gear 90 as will be discussed in more detail below. As such, the sun gear 90 may be rotatable about the rotor axis 80 with the rotor 76. The sun gear 90 may have external teeth that extend away from the rotor axis 80 and mesh with teeth of the planet gears 92. The sun gear 90 may also have internal teeth that may be disposed opposite the external teeth. The internal teeth may be disposed in a hole of the sun gear 90 and may be arranged around and extend toward the rotor axis 80. The internal teeth may facilitate selective engagement or selective coupling with the shift mechanism 34 as will be discussed in more detail below.

One or more planet gears 92 may be rotatably disposed between the sun gear 90 and the planetary ring gear 94. Each planet gear 92 may be rotatable about a corresponding planet gear axis. A planet gear 92 may mesh with the sun gear 90 and the planetary ring gear 94. For instance, each planet gear 92 may have external teeth that extend away from a corresponding planet gear axis and mesh with teeth of the sun gear 90 and teeth of the planetary ring gear 94.

The planetary ring gear 94 extends around the rotor axis 80 and receives the planet gears 92. The planetary ring gear 94 may have a ring that encircles the rotor axis 80 and that has teeth that are arranged around and extend toward the rotor axis 80 and that mesh with teeth of the planet gears 92. The planetary ring gear 94 may be fixedly positioned such that the planetary ring gear 94 is not rotatable about the rotor axis 80. In at least one configuration, the planetary ring gear 94 may include a support module 100 and a countershaft support 102.

Figure 4:
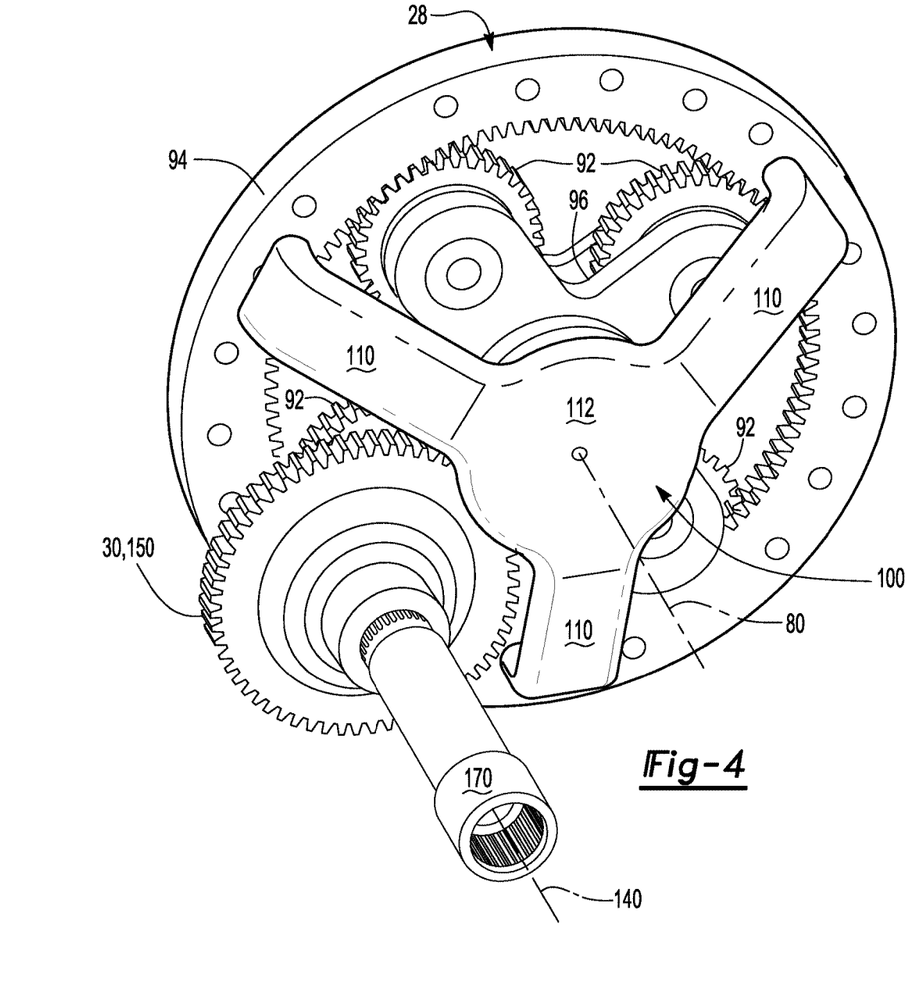
FIG. 4 is a perspective view of the planetary gear set and a connecting gear.
Figure 5:
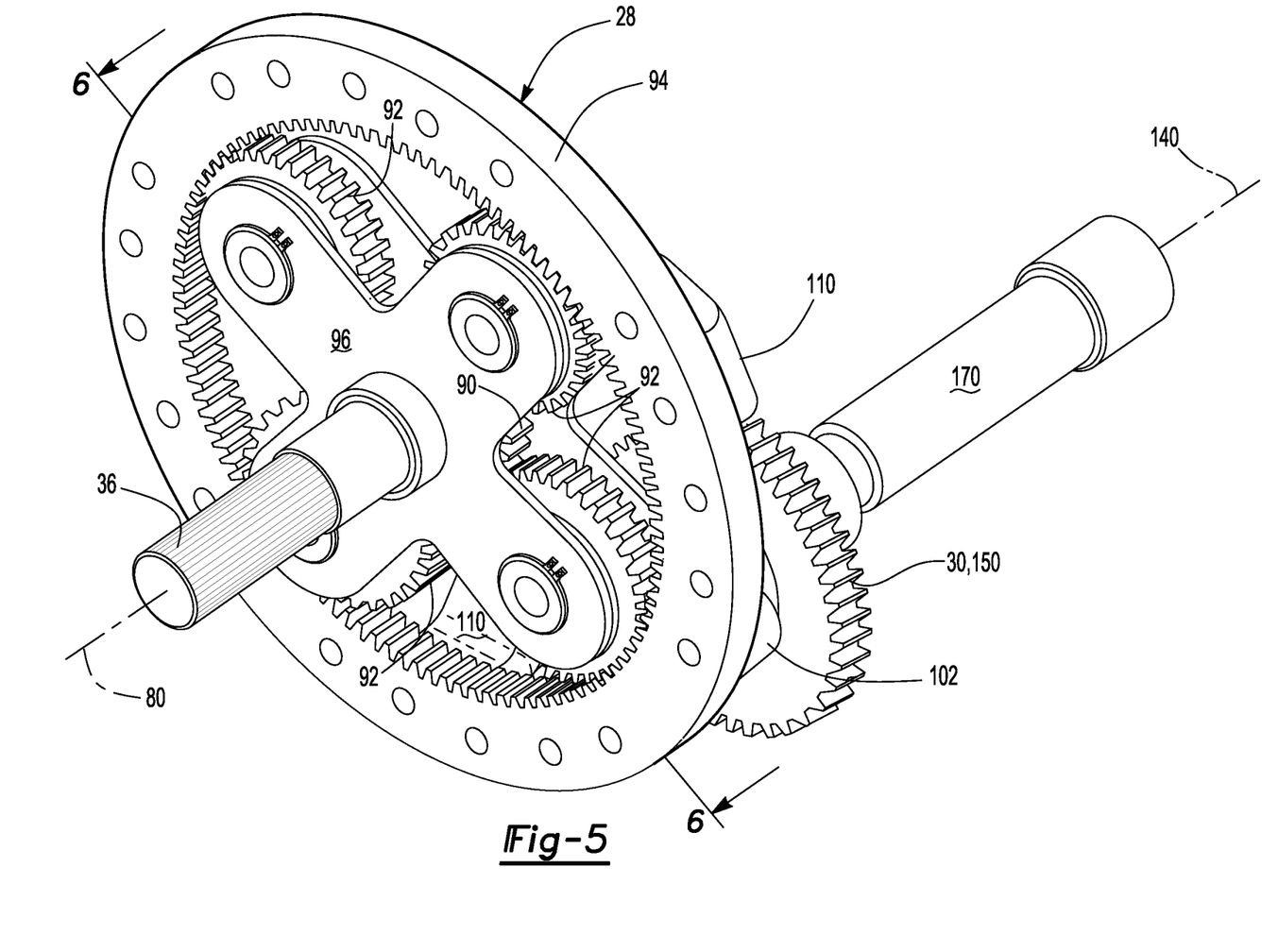
FIG. 5 is another perspective view of the planetary gear set and the connecting gear.

Referring primarily to FIGS. 3 and 4, the support module 100 is configured to help support the planet gear carrier 96. The support module 100 may extend from the planetary ring gear 94. For instance, the support module 100 may extend from the planetary ring gear 94 in a direction that extends away from the electric motor module 26. The support module 100 may be integrally formed as a unitary one-piece component with the ring of the planetary ring gear 94 that has teeth that mesh with the planet gears 92 or may be a separate component that is fixedly coupled to the ring of the planetary ring gear 94. In at least one configuration, the support module 100 may include a set of arms 110 and a center support 112.

The set of arms 110 may extend from the ring of the planetary ring gear 94 to the center support 112. In the configuration shown in FIG. 4 three arms 110 are shown; however, it is contemplated that a greater or lesser number of arms may be provided. The arms 110 may be spaced apart from each other and may or may not be equidistantly spaced from each other. The arms 110 may extend from a side of the ring of the planetary ring gear 94 that faces toward the differential assembly 22 toward the differential assembly 22. In addition, the arms 110 may extend from the ring of the planetary ring gear 94 toward the rotor axis 80. For instance, the arms 110 or a portion thereof may extend at an angle such that the arms 110 extend closer to the rotor axis 80 as the distance from the ring of the planetary ring gear 94 increases.

Referring to FIGS. 3 and 4, the center support 112 is disposed at distal ends of the arms 110. The center support 112 may be disposed along the rotor axis 80 and may be axially positioned closer to the differential assembly 22 than other components of the planetary gear set 28, such as the sun gear 90, the planet gears 92, the ring of the planetary ring gear 94, and the planet gear carrier 96. The center support 112 may be disposed substantially perpendicular to the rotor axis 80 and may be spaced apart from the differential assembly 22. In at least one configuration and as is best shown in FIG. 6, the center support 112 may include a support shaft 120.

The support shaft 120 extends along the rotor axis 80 toward the rotor 76 or to the left from the perspective shown in FIG. 6. The support shaft 120 may be fixedly positioned with respect to the center support 112. For instance, the support shaft 120 may be integrally formed with the center support 112 or may be a separate component that is fixedly attached to the center support 112. Thus, the support shaft 120 may be fixedly positioned with respect to the ring of the planetary ring gear 94. The support shaft 120 may help support the planetary gear set 28, the shift mechanism 36, or both. In the configuration shown, the support shaft 120 is configured as a hollow tube that extends from the center support 112 toward the electric motor module 26. In at least one configuration, the center support 112 may not extend into the electric motor module 26. The center support 112 may be encircled by the shift mechanism 36, the sun gear 90, the planet gear carrier 96, or combinations thereof. In at least one configuration, the support shaft 120 may be encircled by a bearing assembly 122 that may rotatably support the planet gear carrier 96 on the support shaft 120. The bearing assembly 122 may be configured as a roller bearing assembly that may be disposed adjacent to the center support 112.

Referring primarily to FIG. 6, the countershaft support 102 is configured to support the connecting gear 30 and the countershaft 170 of the countershaft transmission 32. The countershaft support 102 may extend from the ring of the planetary ring gear 94 in a direction that extends away from the electric motor module 26. For instance, the countershaft support 102 may protrude toward the differential assembly 22 but may not protrude as far from the ring of the planetary ring gear 94 as the center support 112. In addition, a free end of the countershaft support 102 may be disposed closer to the rotor axis 80 than the ring of the planetary ring gear 94 is disposed to the rotor axis 80. The countershaft support 102 may be spaced apart from the set of arms 110 and may be disposed below the center support 112 of the support module 100. In at least one configuration, the countershaft support 102 may include a connecting wall 130 and a shaft portion 132.

The connecting wall 130 may extend from the ring of the planetary ring gear 94 to the shaft portion 132. The connecting wall 130 may protrude from the ring of the planetary ring gear 94 past the planet gears 92 and then extend toward the rotor axis 80.

The shaft portion 132 may protrude from the connecting wall 130 in a direction that extends away from the electric motor module 26. The shaft portion 132 may be encircled by a bearing assembly 134. The bearing assembly 134 may rotatably support the connecting gear 30 on the shaft portion 132 of the countershaft support 102. The connecting gear 30 may encircle the bearing assembly 134.

Referring primarily to FIGS. 4 and 6, the connecting gear 30 operatively connects the planetary gear set 28 to the countershaft transmission 32. The connecting gear 30 is rotatable about a countershaft axis 140 with a countershaft of the countershaft transmission 32. In at least one configuration, the connecting gear 30 may include a gear portion 150 and a cavity 152.

The gear portion 150 may include a set of teeth that may be arranged around the countershaft axis 140. The teeth may face away from the countershaft axis 140 and mesh with corresponding teeth of an external gear of the planet gear carrier 96 as will be discussed in more detail below. The gear portion 150 may encircle the cavity 152, the bearing assembly 134, the shaft portion 132, or combinations thereof.

Referring primarily to FIG. 6, the cavity 152 may extend along the countershaft axis 140. In at least one configuration, the cavity 152 may be configured as a through hole that may extend through the connecting gear 30. The cavity 152 may receive the bearing assembly 134 and the shaft portion 132 of the countershaft support 102. In addition, the cavity 152 may receive the countershaft 170 of the countershaft transmission 32. For instance, the countershaft 170 may extend into the cavity 152 and the connecting gear 30 may be fixedly disposed on the countershaft 170 such that the connecting gear 30 is rotatable about the countershaft axis 140 with the countershaft 170. It is also contemplated that the countershaft 170 may not extend into the cavity 152 in other configurations.

Referring primarily to FIGS. 3 and 6, the planet gear carrier 96 rotatably supports the planet gears 92. In addition, the planet gear carrier 96 is rotatable about the rotor axis 80. For instance, the planet gear carrier 96 may be rotatably supported on the support module 100 as previously discussed. The planet gear carrier 96 may be positioned along the rotor axis 80 between the electric motor module 26 and the center support 112. In at least one configuration, the planet gear carrier 96 may include an internal gear 160, an external gear 162, and a recess 164.

The internal gear 160 facilitates coupling of the planet gear carrier 96 to the shift mechanism 36. The internal gear 160 may be disposed inside the planet gear carrier 96. For instance, the internal gear 160 may include a set of teeth that may be arranged around the rotor axis 80 and that may face toward the rotor axis 80. The internal gear 160 may be axially positioned between the bearing assembly 122 and the recess 164.

The external gear 162 meshes with the connecting gear 30. The external gear 162 may include a set of teeth that may be arranged around the rotor axis 80 and that may face away from the rotor axis 80. The external gear 162 may be axially positioned or positioned along the rotor axis 80 closer to the center support 112 than the internal gear 160 is positioned to the center support 112. In at least one configuration, the external gear 162 may encircle the bearing assembly 122.

The recess 164 may be disposed adjacent to the internal gear 160. The recess 164 may have a larger diameter than the internal gear 160 and may receive a portion of a bearing or bushing 166 that extends to the sun gear 90 to help position the sun gear 90.

Referring to FIG. 2, the countershaft transmission 32 may operatively connect the planetary gear set 28 to the drive pinion 34. The countershaft transmission 32 may be spaced apart from the electric motor module 26 such that the differential assembly 22 is positioned between the countershaft transmission 32 and the planetary gear set 28. The countershaft transmission 32 may be disposed inside the housing assembly 20. In at least one configuration, the countershaft transmission 32 may include the countershaft 170, one or more countershaft gears 172, and one or more drive pinion gears 174.

The countershaft 170 is rotatable about a countershaft axis 140. The countershaft axis 140 may be disposed parallel or substantially parallel to the rotor axis 80. The countershaft axis 140 may differ from the rotor axis 80. For instance, the countershaft axis 140 may be offset from and may not be coaxially disposed with the rotor axis 80. The countershaft 170 may be rotatably supported on the housing assembly 20 by one or more roller bearing assemblies.

One or more countershaft gears 172 may be disposed on the countershaft 170. The countershaft gears 172 may be rotatable about the countershaft axis 140 with the countershaft 170. For instance, a countershaft gear 172 may be fixedly coupled to the countershaft 170 or may be selectively couplable to the countershaft 170, such as with a clutch. In the configuration shown, two countershaft gears 172 are illustrated; however, it is contemplated that a greater or lesser number of countershaft gears 172 may be provided. When multiple countershaft gears are provided, the countershaft gears may have different diameters and may be configured to provide different gear ratios. Each countershaft gear 172 may mesh with a corresponding drive pinion gear 174.

One or more drive pinion gears 174 may be disposed on the drive pinion 34. The drive pinion gears 174 may be rotatable about a drive pinion axis 190 with the drive pinion 34. For instance, a drive pinion gear may be fixedly coupled to the drive pinion 34 or may be selectively couplable to the drive pinion 34, such as with a clutch.

The drive pinion 34 is rotatable about the drive pinion axis 190. The drive pinion axis 190 may be disposed parallel or substantially parallel to the countershaft axis 140. The drive pinion axis 190 may differ from the rotor axis 80, the countershaft axis 140, or both. For instance, the drive pinion axis 190 may be offset from and may not be coaxially disposed with the rotor axis 80, the countershaft axis 140, or both. In an axle assembly that includes a countershaft transmission 32, the drive pinion 34 may operatively connect the countershaft transmission 32 to the differential assembly 22. In at least one configuration, the drive pinion 34 may include a gear portion 200 and a shaft portion 202.

The gear portion 200 may be disposed at or near an end of the drive pinion 34. The gear portion 200 may have a plurality of teeth that may mate or mesh with corresponding teeth of the ring gear 62 of the differential assembly 22.

The shaft portion 202 may extend along and may be rotatable about the drive pinion axis 190 with the gear portion 200. The shaft portion may support the drive pinion gears 174.

Figure 7:
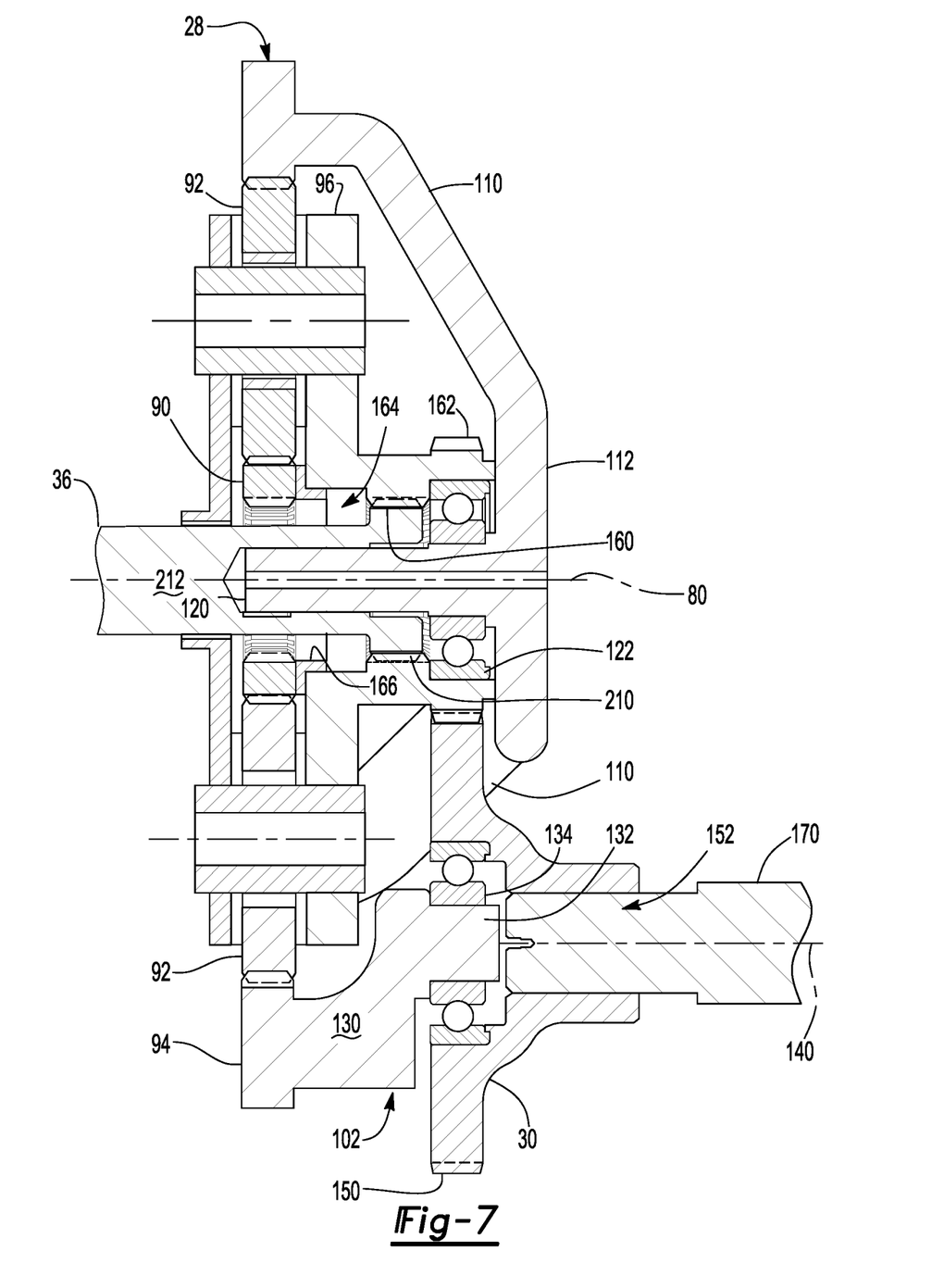
FIG. 7 is a section view showing the shift mechanism in a second position.

Referring primarily to FIGS. 3, 6, and 7, the shift mechanism 36 may cooperate with the planetary gear set 28 to provide a desired gear reduction ratio to change the torque transmitted between the electric motor module 26 and the countershaft transmission 32. The shift mechanism 36 may be rotatable about the rotor axis 80 and may be moveable along the rotor axis 80. In at least one configuration, the shift mechanism 36 may include a coupling feature 210 and a shaft 212.

The coupling feature 210 is configured to selectively couple the shift mechanism 36 to a component of the planetary gear set 28. The coupling feature 210 may be disposed proximate an end of the shaft 212. The coupling feature 210 may have any suitable configuration. For instance, the coupling feature 210 may include a set of teeth that may be arranged around the rotor axis 80 and that may face away from the rotor axis 80. The teeth of the coupling feature 210 may be positioned to selectively mesh with the internal teeth of the sun gear 90 or the teeth of the internal gear 160 of the planet gear carrier 96.

The shaft 212 is operatively connected to the rotor 76. The shaft 212 may extend along or around the rotor axis 80 and may be rotatable about the rotor axis 80 with the rotor 76. The shaft 212 may also be moveable along the rotor axis 80 with respect to the rotor 76.

Referring to FIGS. 2 and 3, the shift mechanism 36 may be actuated along the rotor axis 80 by a shift mechanism actuator 220. The shift mechanism actuator 220 may be of any suitable type, such as an electrical actuator, electromechanical actuator, mechanical actuator, or the like. The shift mechanism actuator 220 may be disposed in any suitable location. In the configuration shown, the shift mechanism actuator 220 is mounted to the cover 78 of the electric motor module 26. The shift mechanism actuator 220 may actuate or move the shift mechanism 36 along the rotor axis 80 between a first position and a second position.

Referring to FIG. 6, the shift mechanism 36 is shown in the first position. The shift mechanism 36 may couple or operatively connect the rotor 76 to the sun gear 90 when in the first position, thereby providing a first drive gear ratio. The coupling feature 210 of the shift mechanism 36 may engage and mesh with the internal teeth of the sun gear 90 when in the first position. Torque may be transmitted from the rotor 76 to the sun gear 90, from the sun gear 90 to the planet gear carrier 96 via the planet gears 92, and then from the planet gear carrier 96 to the connecting gear 30 when the shift mechanism 36 is in the first position. The shift mechanism 36 may not contact or directly couple the planet gear carrier 96 to the rotor 76 when in the first position. As such, the planet gear carrier 96 may be rotatable about the rotor axis 80 at a different speed than the sun gear 90 when the shift mechanism 36 is in the first position.

Referring to FIG. 7, the shift mechanism 36 is shown in the second position. The shift mechanism 36 may couple or operatively connect the rotor 76 to the planet gear carrier 96 when in the second position, thereby providing a second drive gear ratio that may differ from the first drive gear ratio. The coupling feature 210 of the shift mechanism 36 may engage and mesh with the internal gear 160 of the planet gear carrier 96 when in the second position. Torque may be transmitted from the rotor 76 to the planet gear carrier 96, and from the planet gear carrier 96 to the connecting gear 30 when the shift mechanism is in the second position. The shift mechanism 36 may not contact or directly engage the sun gear 90 when in the second position. As such, the sun gear 90 may be rotatable about the rotor axis 80 at a different speed than the planet gear carrier 96 when the shift mechanism 36 is in the second position.

An axle assembly as described above may allow multiple gear ratios to be provided using both a planetary gear set and a transmission. This may allow a greater number of gear ratios to be provided than with a planetary gear set or transmission alone. In addition, an axle assembly as described above may allow the planetary gear set and the transmission to be placed on opposite sides of the differential assembly, which may reduce the overall length of the axle assembly and provide a more compact axle assembly, which in turn may reduce weight and package space requirements.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an electric motor having a rotor that is rotatable about a rotor axis;
   a countershaft that is rotatable about a countershaft axis;
   a planetary gear set that operatively connects the rotor to the countershaft, the planetary gear set including a planetary ring gear and a planet gear carrier, wherein the planet gear carrier is rotatably supported on a support module that extends from the planetary ring gear and the planetary ring gear is not rotatable with respect to the planet gear carrier;
   a differential assembly; and
   a drive pinion that is rotatable about a drive pinion axis and that operatively connects the differential assembly to the countershaft.

2. The axle assembly of claim 1 wherein the rotor axis, the countershaft axis, and the drive pinion axis differ from each other.

3. The axle assembly of claim 1 wherein the planetary gear set includes:
   a sun gear that is rotatable about the rotor axis; and
   a planet gear that meshes with the sun gear and the planetary ring gear;
   wherein the planet gear carrier is rotatable about the rotor axis and rotatably supports the planet gear.

4. An axle assembly comprising:
   an electric motor having a rotor that is rotatable about a rotor axis;
   a countershaft that is rotatable about a countershaft axis;
   a planetary gear set that operatively connects the rotor to the countershaft, the planetary gear set including a planetary ring gear and a planet gear carrier, wherein the planet gear carrier is rotatably supported on a support module that extends from the planetary ring gear;
   a differential assembly; and
   a drive pinion that is rotatable about a drive pinion axis and that operatively connects the differential assembly to the countershaft, wherein the countershaft is rotatably supported on the planetary ring gear.

5. An axle assembly comprising:
   an electric motor having a rotor that is rotatable about a rotor axis;
   a countershaft that is rotatable about a countershaft axis;
   a planetary gear set that operatively connects the rotor to the countershaft, the planetary gear set including a planetary ring gear and a planet gear carrier, wherein the planet gear carrier is rotatably supported on a support module that extends from the planetary ring gear;
   a differential assembly; and
   a drive pinion that is rotatable about a drive pinion axis and that operatively connects the differential assembly to the countershaft, wherein the support module includes a set of arms that extends from the planetary ring gear to a center support.

6. The axle assembly of claim 5 wherein members of the set of arms are spaced apart from each other and extend from the planetary ring gear toward the rotor axis.

7. The axle assembly of claim 5 wherein the planet gear carrier is axially positioned between the center support and the rotor.

8. The axle assembly of claim 5 wherein the countershaft axis is disposed below the center support.

9. The axle assembly of claim 5 wherein the center support includes a support shaft that extends along the rotor axis toward the rotor, wherein the planet gear carrier encircles the support shaft.

10. The axle assembly of claim 9 wherein a bearing assembly encircles the support shaft and rotatably supports the planet gear carrier on the support shaft.

11. The axle assembly of claim 10 further comprising a shift mechanism that is rotatable about the rotor axis and moveable along the rotor axis between a first position in which the shift mechanism connects the rotor to a sun gear of the planetary gear set and a second position in which the shift mechanism connects the rotor to the planet gear carrier.

12. The axle assembly of claim 11 further comprising a shift mechanism actuator that actuates the shift mechanism, wherein the shift mechanism actuator is mounted to a cover that is disposed at an end of the electric motor that faces away from the planetary gear set.

13. The axle assembly of claim 11 wherein the shift mechanism includes a cavity that receives the support shaft.

14. The axle assembly of claim 1 wherein the planet gear carrier includes an external gear that meshes with a connecting gear that is rotatable about the countershaft axis with the countershaft.

15. An axle assembly comprising:
- an electric motor having a rotor that is rotatable about a rotor axis;
- a countershaft that is rotatable about a countershaft axis;
- a planetary gear set that operatively connects the rotor to the countershaft, the planetary gear set including a planetary ring gear and a planet gear carrier, wherein the planet gear carrier is rotatably supported on a support module that extends from the planetary ring gear;
- a differential assembly; and
- a drive pinion that is rotatable about a drive pinion axis and that operatively connects the differential assembly to the countershaft, wherein the support module includes an arm that extends from the planetary ring gear to a center support, wherein the planet gear carrier includes an external gear that meshes with a connecting gear that is rotatable about the countershaft axis with the countershaft, and the external gear faces away from the rotor axis and is axially positioned along the rotor axis closer to the center support than an internal gear of the planet gear carrier that faces toward the rotor axis is positioned to the center support.

16. The axle assembly of claim 14 wherein the external gear encircles a bearing assembly that rotatably supports the planet gear carrier on a support shaft that extends along the rotor axis toward the rotor, wherein the support shaft is fixedly coupled to the planetary ring gear.

17. The axle assembly of claim 14 wherein the planetary ring gear includes a countershaft support that extends away from the electric motor and that supports the connecting gear.

18. The axle assembly of claim 17 wherein a bearing assembly encircles the countershaft support and rotatably supports the connecting gear on the countershaft support.

19. The axle assembly of claim 18 wherein the connecting gear defines a cavity that receives the bearing assembly and the countershaft.

20. The axle assembly of claim 18 wherein the connecting gear encircles the bearing assembly.

* * * * *